April 14, 1931. D. C. DUPRE 1,800,514
CONVERTIBLE BODY FOR MOTOR VEHICLES
Filed June 13, 1928 2 Sheets-Sheet 1
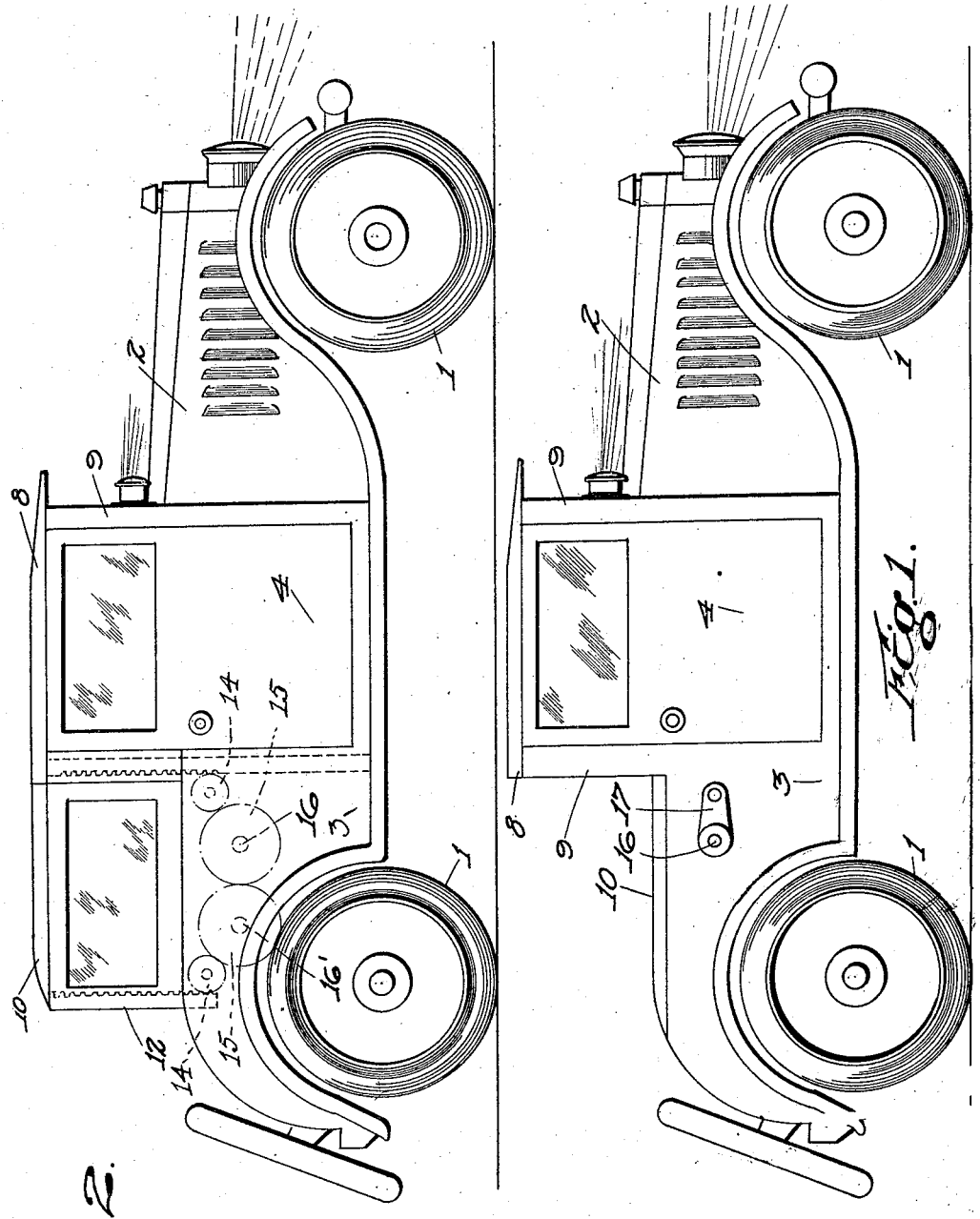

April 14, 1931. D. C. DUPRE 1,800,514
CONVERTIBLE BODY FOR MOTOR VEHICLES
Filed June 13, 1928 2 Sheets-Sheet 2
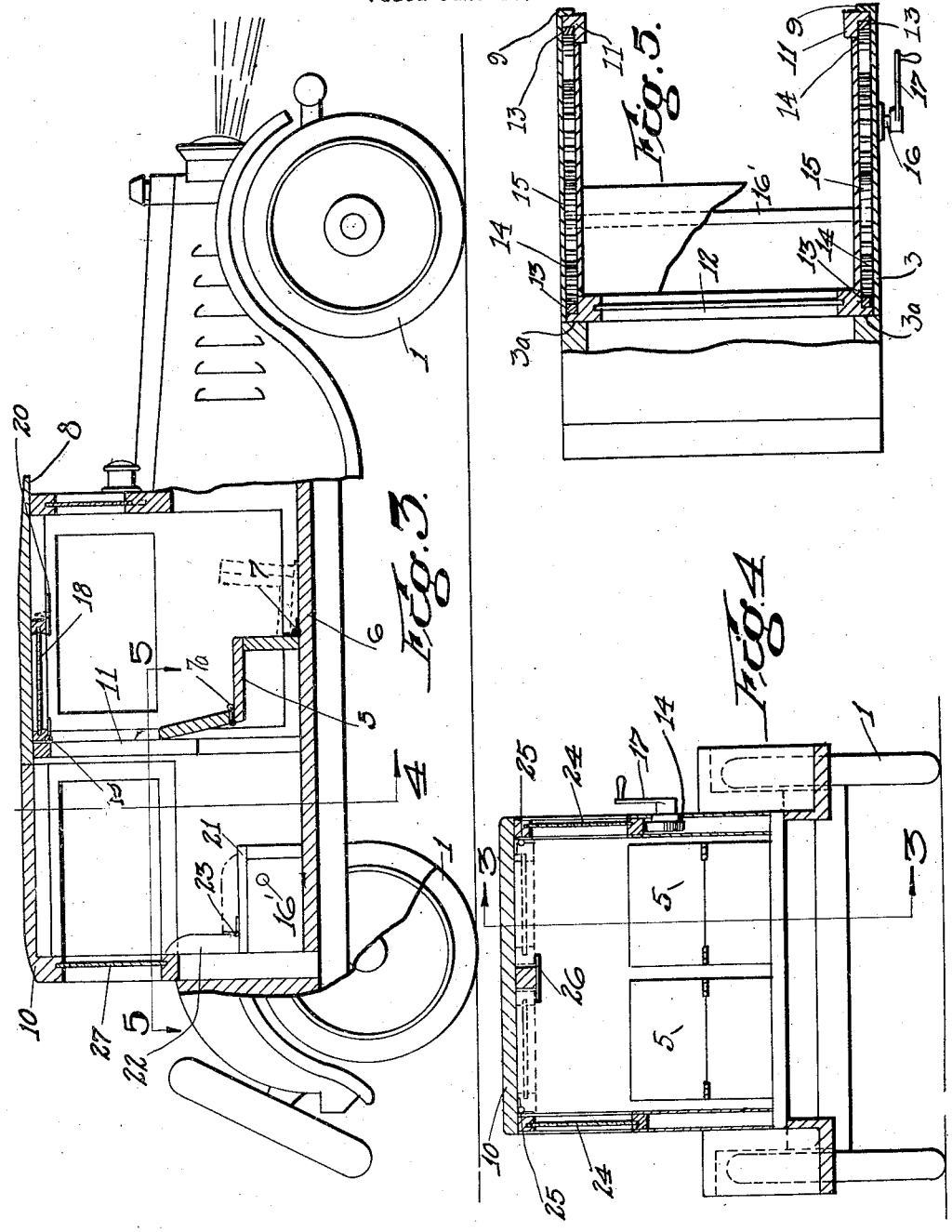
Inventor:
David C. Dupre
By Owen W. Kennedy
Attorney Patented Apr. 14, 1931

1,800,514

UNITED STATES PATENT OFFICE

DAVID C. DUPRE, OF WORCESTER, MASSACHUSETTS

CONVERTIBLE BODY FOR MOTOR VEHICLES

Application filed June 13, 1928. Serial No. 284,949.

My invention relates to bodies for motor vehicles and has for its object to provide an improved body construction whereby the vehicle may be readily converted from a coupe type providing only a front seat for two or three persons, to a closed sedan or coach type providing an additional seat in the rear of the front seat.

While I am aware that single seated vehicles of the coupe type have been heretofore provided with an additional collapsible rumble seat, such vehicles have always been open to the objection that absolutely no protection from the weather is provided for the occupants of the rear, or rumble seat. By my invention, I propose to overcome the usual objections to an unprotected rumble seat by providing means for completely enclosing and protecting the occupants of the rear seat when the vehicle is converted into a two seater, both seats then being within adjacent compartments. The above and other advantageous features of my invention will hereinafter more fully appear, reference being had to the accompanying drawings in which—

Fig. 1 is a view in side elevation of a vehicle embodying my invention as it appears when used with only a front seat.

Fig. 2 is a view of the vehicle shown in Fig. 1 converted into a sedan or coach with two seats.

Fig. 3 is a vertical sectional view along the line 3—3 of Fig. 4.

Fig. 4 is a transverse sectional view along the line 4—4 of Fig. 3 looking in the direction of the arrow.

Fig. 5 is a horizontal sectional view along the line 5—5 of Fig. 3.

Like reference characters refer to like parts in the different figures.

Referring to drawings the vehicle comprises the usual chassis on which are mounted the wheels 1, hood 2 and body 3. The body 3 provides a forward closed compartment having doors 4 opening therefrom with front seats 5 supported by the floor 6 of the body. The seat 5 next to the driver's seat is hinged to the floor 6, as indicated at 7, while the back is hinged at 7a so that the seat can be folded forward into the position shown in dotted lines in Fig. 3, when access is desired to the rear compartment.

The roof 8 of the front compartment is supported on posts 9 and when the vehicle is being used as a coupe, as shown in Fig. 1, the roof 8 is spaced above a movable deck 10 which extends rearwardly and merges with the curvature of the body 3 at the rear. The movable deck 10 is supported at its forward end on posts 11, which as best shown in Fig. 5, are slidably received in slots provided in the stationary posts 9 which support the rear of the roof 8. The rear end of the deck 10 is supported by a panel 12 which is slidably received, at its ends, in slots 3a provided in the sides of the body 3, so that the entire deck 10 can be raised or lowered with respect to the body 3.

For the purpose of moving the deck 10, the posts 11 and ends of the panel 12 which support the deck 10 are provided with oppositely facing toothed racks 13, and as shown in Fig. 5, each rack 13 has a pinion 14 in mesh therewith. The pinions 14 are the same size and are each in mesh with a large gear 15, that are in turn in mesh with each other. All of the pinions 14 and gears 15 are mounted in the sides of the body 3 in the rear of the doors 4 and the shaft 16 which carries the forward gear 15, provides a handle 17 whereby the shaft 16 may be turned. Turning of the handle 17 causes the pinions 14 to raise the four racks 13 carrying the deck 10 and this raising may be accomplished by the application of a comparatively small force, by reason of the leverage obtained through the large gears 15 driving the pinions 14. The shaft 16' which carries the rearward gear 15 extends across the body, as shown in Fig. 5, so that all the gears and racks are driven in unison.

When the deck 10 has been raised by turning the handle 17, the vehicle appears as shown in Fig. 2, wherein the deck 10 is flush with the stationary roof 8 of the forward compartment. The vehicle then has the appearance of a closed two seated coach, or sedan, and access may be had to the closed rear compartment thus provided, by opening the right-hand door 4 and folding forward the seat 5 next to the driver's seat. Before converting the vehicle to provide the rear compartment, the rear window 18 of the forward compartment, being hinged at 19 along its upper edge, can be swung upwardly and secured by a latch 20 as shown in Fig. 3.

The rear compartment provides a seat 21 secured to the floor 6 and the back 22 of this seat is hinged at 23, so that it may be folded down into engagement with the seat 21 when it is desired to lower the deck 10. As best shown in Fig. 4, side windows 24 for the collapsible rear compartment are hinged along their upper edges at 25, so that these windows 24 can be swung upwardly in engagement with the underside of the deck 10 before collapsing the compartment. The turned back position of the windows 24, is shown in dotted lines in Fig. 4 which also shows a latch 26 for holding the windows 24 in their folded back position. With the windows 24 folded back, it is possible for the lowered deck 10 to make a completely water tight seal with the sides of the body 3, since the deck overlaps the sides of the body as indicated in Fig. 4. The rear window 27 of the back compartment is carried by the panel 12 which supports the rear of the movable deck 10, the window 27 moving into the body 3 when the deck 10 is lowered.

From the foregoing, it is apparent that by my invention I have provided an improved body construction for motor vehicles that can be readily adapted to provide one or two seats completely inclosed and protected. The fact that the top of the rear compartment becomes the back deck of the body when the rear compartment is collapsed assures a continuous smooth line for the rear of the vehicle which in no way detracts from its appearance. The raising or lowering of the rear deck 10 to provide, or do away, with the rear compartment can be quickly and conveniently accomplished by reason of the gearing concealed within the sides of the body, the gearing being so designed that the conversion of the body can be readily made by the ordinary car user.

I claim,

1. In a motor vehicle, a body providing front and rear seats, rigid posts supporting a top and side doors permanently enclosing said front seat, a movable deck portion extending over the rear seat below the level of said top and means for raising said deck portion on said posts to the level of the top to provide a compartment enclosing said rear seat, said deck portion carrying hinged windows on two sides and a fixed rear window to enclose the rear seat compartment.

2. In a convertible automobile, a body providing front and rear seats, rigid posts extending upwardly from said body to support a permanent top and doors enclosing the front seat and a collapsible compartment for enclosing the rear seat comprising a top and windows adapted to be raised and lowered as a unit on the rear posts of the front compartment.

3. In a convertible automobile, a body providing front and rear seats, rigid posts extending upwardly from said body to support a permanent top and doors enclosing the front seat and a collapsible compartment for enclosing the rear seat comprising posts slidable on the rear posts of the front compartment for supporting an assembly consisting of top, side windows, and rear panel.

4. In a convertible automobile, a body providing front and rear seats, rigid posts extending upwardly from said body to support a permanent top and doors enclosing the front seat and a collapsible compartment for enclosing the rear seat comprising an assembly consisting of top, hinged windows, a fixed rear panel movable on the rear posts of the front compartment and means for raising said assembly to bring said top into alinement with the fixed top of the front compartment or lowering it into alinement with the rear of the body.

5. In a convertible automobile, a body providing front and rear seats, rigid posts extending upwardly from said body to support a permanent top and doors enclosing the front seat and a collapsible compartment for enclosing the rear seat comprising posts slidable on the rear posts of the front compartment and a fixed rear panel slidable in the body for supporting a top and hinged windows and means cooperating with said slidable posts and rear panel for raising and lowering said rear compartment, said hinged windows folding against the top of the rear compartment when it is collapsed.

6. In a convertible automobile, a body providing front and rear seats, rigid posts extending upwardly from said body to support a permanent top and doors enclosing the front seat and a collapsible compartment for enclosing the rear seat comprising posts movable on the rear posts of the front compartment and a fixed rear panel slidable in said body for supporting between them a top and hinged windows and gearing comprising rack teeth on said movable posts and rear panel and pinions mounted in the walls of the body for raising and lowering said rear compartment, said hinged windows folding against the top of the rear compartment when it is collapsed.

DAVID C. DUPRE.